(12) United States Patent
Chaney (10) Patent No.: US 9,635,847 B1
(45) Date of Patent: May 2, 2017

(54) FISHING LINE TYING TOOL (71) Applicant: John Chaney, Portland, OR (US)

(72) Inventor: John Chaney, Portland, OR (US)

( * ) Notice: Subject to any disclaimer, the term of this patent is extended or adjusted under 35 U.S.C. 154(b) by 0 days.

(21) Appl. No.: 15/346,533

(22) Filed: Nov. 8, 2016

(51) Int. Cl.
A01K 97/26 (2006.01)
A01K 91/04 (2006.01)
A01K 91/047 (2006.01)
B65H 69/04 (2006.01)

(52) U.S. Cl.
CPC .............. A01K 97/26 (2013.01); A01K 91/04 (2013.01); A01K 91/047 (2013.01); B65H 69/04 (2013.01)

(58) Field of Classification Search
CPC ...... A01K 97/26; A01K 91/04; A01K 91/047; B65H 69/04; B65H 2701/30
See application file for complete search history.

(56) References Cited

U.S. PATENT DOCUMENTS

| | | | | |
|---|---|---|---|---|
| 1,452,906 A * | 4/1923 | Butler | ................... | B65H 69/06 289/17 |
| 2,469,037 A * | 5/1949 | Harvey | ................. | A01K 91/04 289/1.5 |
| 2,488,414 A * | 11/1949 | King | .................... | A01K 91/047 28/141 |
| 2,622,462 A * | 12/1952 | Poetker | ................. | A01K 97/26 220/315 |
| 3,787,081 A * | 1/1974 | Macy | .................... | A01K 91/04 289/17 |
| 4,403,797 A * | 9/1983 | Ragland, Jr. | ........... | A01K 91/04 289/17 |
| 5,207,012 A * | 5/1993 | Lael | ........................ | A01K 97/06 43/4 |
| 5,240,295 A * | 8/1993 | Spencer | ................ | B65H 69/04 289/1.5 |
| 5,690,370 A * | 11/1997 | Steck, III | ............. | A01K 91/047 289/17 |
| 9,474,259 B2 * | 10/2016 | Banda | .................. | A01K 91/047 |

* cited by examiner

Primary Examiner — Ismael Izaguirre
(74) Attorney, Agent, or Firm — Mark S Hubert (57) ABSTRACT A fishing line tying tool designed to hold an eyelet bearing apparatus in its plier jaws and constrain two sections of fishing line, such that when the sections of line are brought together above the tool, can be quickly wound by rotation of a centralized post located at the bottom of the tool. There are a pair of opposing winder posts formed on the handle of the pliers that have two different sets of hooks for the retention of the fishing line thereon.

19 Claims, 10 Drawing Sheets

FISHING LINE TYING TOOL

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to the tying of fly fishing flies, fishing lures, jigs leaders and lines, and more particularly to a handheld device to simplify the tying of the related fishing knots.

BACKGROUND

Henceforth, an improved fly fishing tool that simplifies the tying of fishing line knots that are hard to thread and hold, would fulfill a long felt need in the fishing industry. This new invention utilizes and combines known and new technologies in a unique and novel configuration to overcome the aforementioned problems and accomplish this.

BRIEF SUMMARY

In accordance with various embodiments, an apparatus to simplify the common fishing line knot tying steps such as line to line connections, threading hook eyelets, fly tying, leader/jig/lure connections and the like is provided.

In one aspect, a small, hand held tool for the speedy tying of a plethora of different fishing line knots that offers two independently operable pairs of line separation horns to accommodate different diameter and types of fishing lines.

In another aspect, a portable, manual apparatus is provided, capable of winding fishing line for knot tying.

In yet another aspect, a pair of spring loaded pliers centrally located between two pair of fishing line winder horns is provided, with a spinning post located at the base thereof, is provided.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF CERTAIN EMBODIMENTS

While various aspects and features of certain embodiments have been summarized above, the following detailed description illustrates at least on exemplary embodiment in further detail to enable one skilled in the art to practice such an embodiment. The described example is provided for illustrative purposes and is not intended to limit the scope of the invention.

In the following description, for the purposes of explanation, numerous specific details are set forth in order to provide a thorough understanding of the described embodiment/s. It will be apparent to one skilled in the art, however, that other embodiments of the present invention may be practiced without some of these specific details. While various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The term "line retention means." as used herein including the claims, is to be interpreted according to 35 USC 112 [para] 6 and is to include all devices offering a physical barrier to the escape of a line from under the arc of the hook horns, such as spring clip arms, gates, tabs, protrusions and the equivalent.

As used herein the term "pliers and pair of pliers" refers to the same mechanical tool having a set of two opposing closeable jaws each connected to, or formed on an arm that may be independent or connected to the other arm. "Pair" does denote there are two tools.

The present invention relates to a novel design for a fishing apparatus designed for simplifying the tying of fly fishing and related fishing knots. Preferably, since this tool is used in the fishing environment, all components are made of waterproof materials such as brass, bronze, stainless steel, or/and polymers. The fly tying apparatus has two pieces however it may be operated with just the tool and without the line holder clamp. The line holder clamp just simplifies the separation and handling of the two end of fishing line. Looking at FIGS. 1, 2, 5 and 9 it can be seen that the fishing line tying tool ("tool") is a pair of pliers 4 having a unitary, elastically deformable handle that uses a residual pressure to bias the affixed jaws 8 of the pliers 4 in a normally closed position such that the inner faces 6 of the generally parallel jaws 8 are brought into mating contact along the linear axis of the pliers 4 and the collinear axis of the tool 2. The faces 6 of the pliers are planar so as to allow the secure frictional retention of even the smallest diameter fishing line placed therein. The faces 6 lie along the linear axis of the pliers when additional pressure is applied and they are in the open position. The biasing tension of the pliers is sufficient to retain the fishing line between the jaws yet not cut, crush or otherwise deform the fishing line.

The body of the pliers 4 is generally oval and supports the other components of the tool 2. The handle has two side arms 12 that are connected so as to form a single or unitary handle that upon the application of pressure elastically deforms to open and separate the jaws. At the bottom of the pliers 4 a circular cross section, linear spinning post 10 extends normally. This post 10 has a linear axis that coincides with the linear axis of the pliers 4 and the tool 2. The preferred embodiment post 10 has a cross sectional diameter less than one inch (preferably ⅛ to ⅜ of an inch) to accommodate rotation of the post 10 across a thumb and opposing forefinger. The jaws are opened by pressure exerted simultaneously on both of its side arms 12 inward, toward the linear axis or centerline of the tool 2.

Affixed on either of the plier side arms 12 is a substantially similar line winder post 14. These are opposing and equidistant from the centerline or longitudinal axis of the tool. These posts 14 have a tubular construction with a line winder hook horn 16 extending in a downward semi circular arc from the side of the winder post 14, adjacent its top face 20. At the end of each hook horn 16 is a line retention means 18, preferably a smooth sphere. This sphere serves to prevent the fishing line trapped under the hook horns 16 from sliding out from under the arc of the hook horn. Other equivalent shapes and mechanical devices well known by one skilled in the art, would work equally as well provided that it has no sharp edges for the fishing line to get cut or nicked on.

Figures 1, 2:
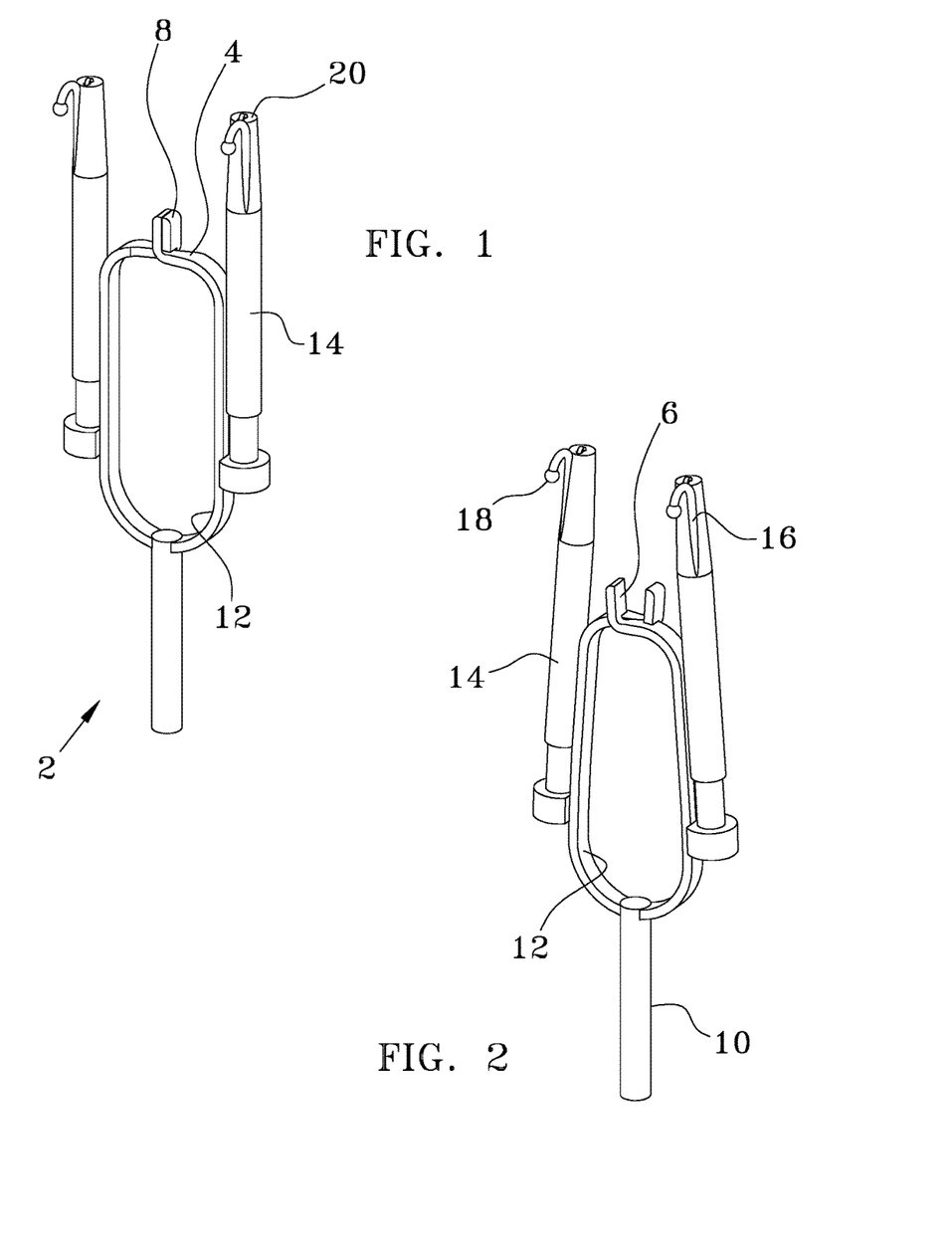
FIG. 1 is a front perspective view of the fishing line tying tool with the pliers shown in the closed or tension biased position.
FIG. 2 is a front perspective view of the fishing line tying tool with the pliers shown in the open or pressure actuated position.
Figure 3:
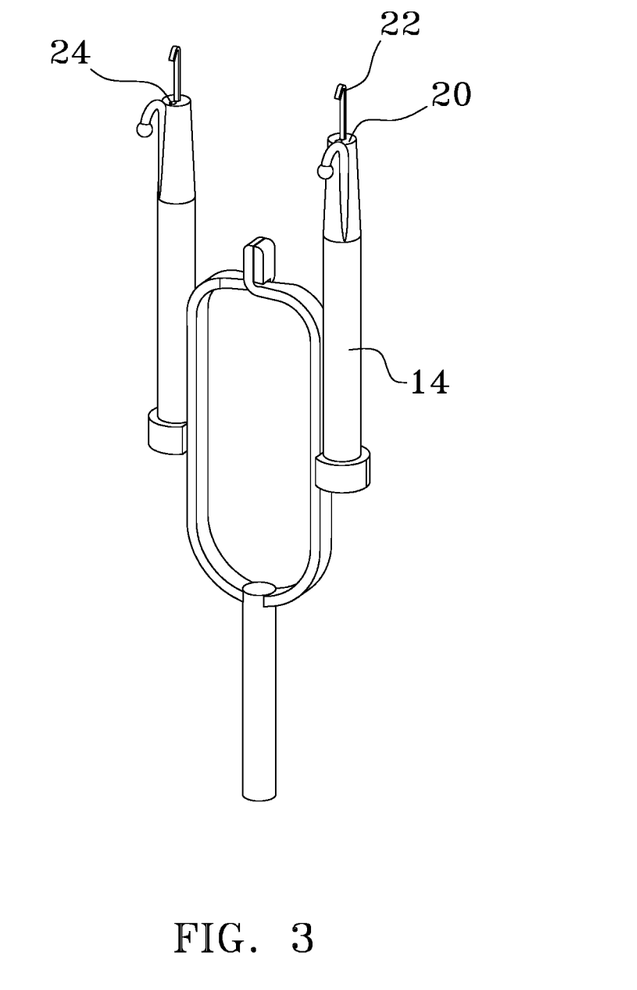
FIG. 3 is a front perspective view of the fishing line tying tool with the retractable line winder clamp hooks extended.

As illustrated in FIG. 3, each winder post 14 has a retractable line winder clamp hook 22 that auto retracts into a central void in the body of the post 14. These clamp hooks 22 are fine gauge rigid wire that extend through an orifice in the generally planar top face 20 of the winder post 14. In the top face is a groove 24 that accepts the arced tip of the clamp hook 22 when the clamp hook 22 is retracted into the body of the post 14. In this manner, when a line is placed beneath the arc of the hooked tip of the clamp hook 22 and the clamp hook 22 is retracted, the line will be frictionally constrained between the arc of the clamp hook 22 and the top face 20 of the winder post 14. This offers much more containment to a trapped fishing line prior to its being wound than is offered by just trapping it under the hook horns 16.

Figures 9, 10, 11:
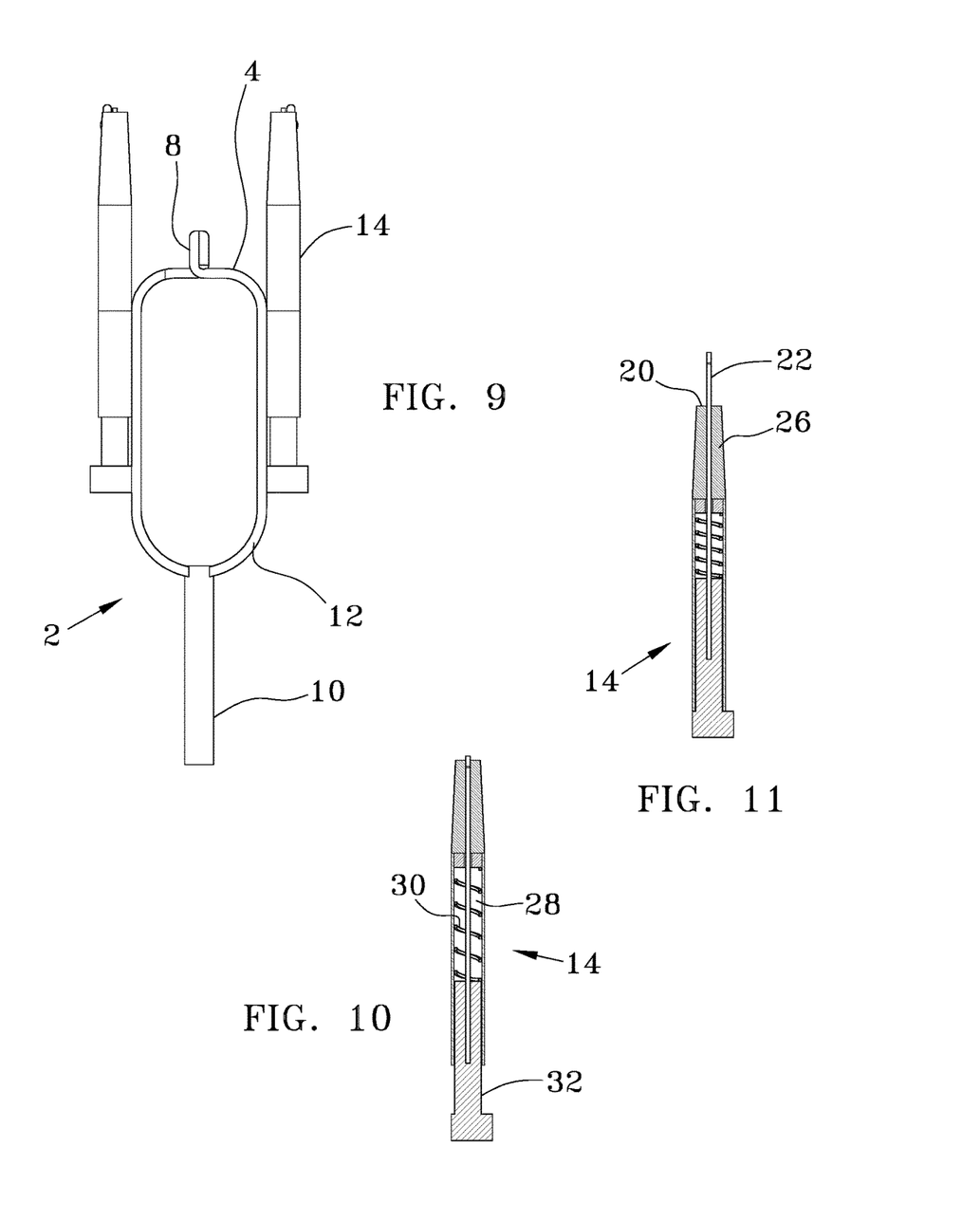
FIG. 9 is a rear view of the fishing line tying tool with the clamp hook retracted.
FIG. 10 is a cross sectional view of the relaxed hook extension actuators within the line winder arms.
FIG. 11 is a cross sectional view of the compressed hook extension actuators within the line winder arms.

Looking at FIGS. 10 and 11, cross sectional views of the line winder posts 14, the internal components of the posts 14 can be seen and their operation best explained. Each winder post 14 has a top cap 26 that forms a frustm with a through bore running along its linear axis. The top cap 26 has the top face 20 formed thereon with a groove 24 formed therein, sized to accommodate the hooked tip of the clamp hook 22. Adjacent the top cap 26 there is a central void 28 in the winder post body. Beneath the central void 28 there is a partially inserted slideable plunger 32. The bottom end of the clamp hook 22 is affixed to the plunger 32. Between the top of the plunger 32 and the bottom of the top cap 26 is a compressible means 30, preferable a linear compression spring.

Figure 4:
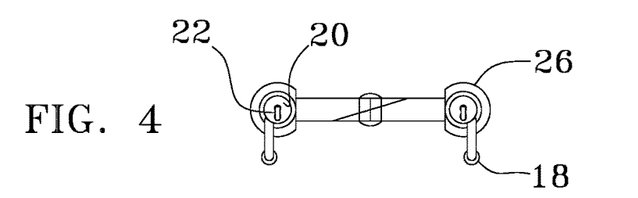
FIG. 4 is a top view of the fishing line tying tool.
Figure 5:
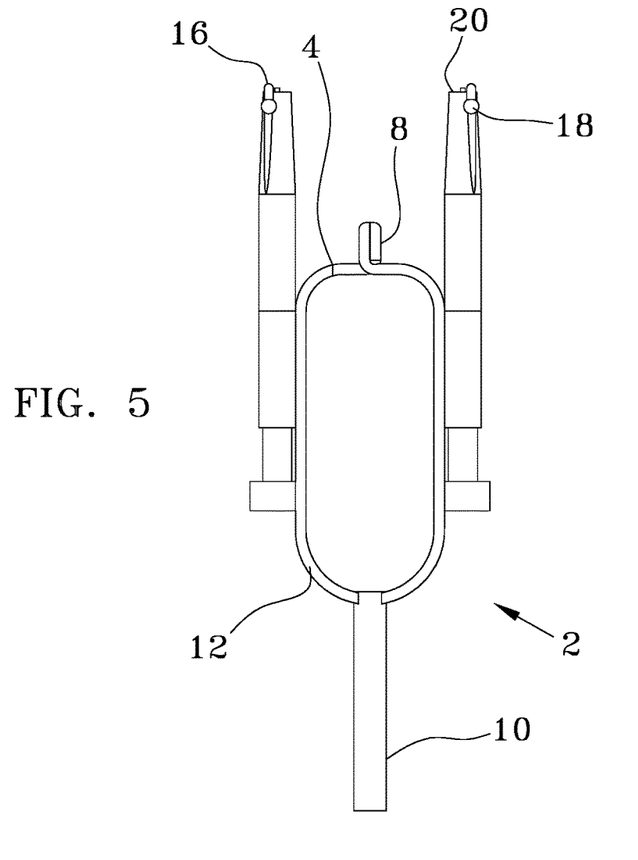
FIG. 5 is a front view fishing line tying tool.
Figure 6:
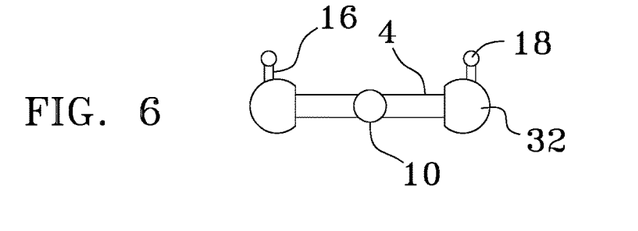
FIG. 6 is a bottom view of the fishing line tying tool.

FIGS. 4 and 6 use top and bottom views of the tool 2 to better clarify the relationship of the various elements of the tool 2.

Figure 7:
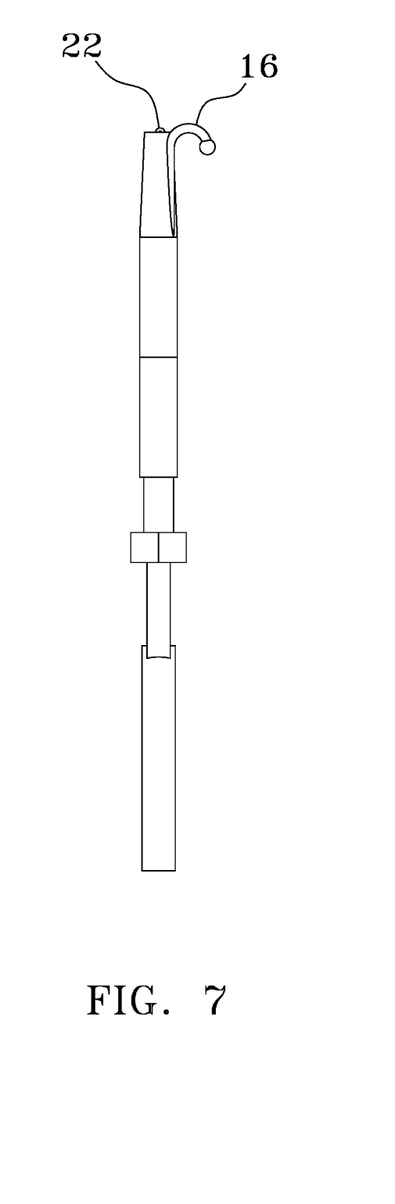
FIG. 7 is a left side view of the fishing line tying tool with the clamp hooks retracted.
Figure 8:
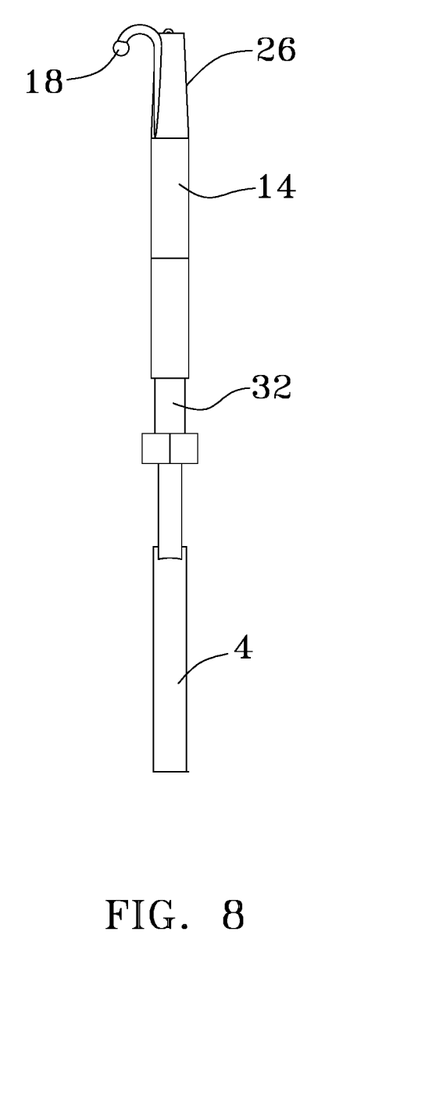
FIG. 8 is a right side view of the fishing line tying tool with the clamp hook retracted.

FIGS. 7 and 8 provide left and right side views for better orientation of the tool's components.

In its normal relaxed position, the linear spring 30 is partially compressed so as to push the plunger 32 down in the central void 28 of the winder post 14 until contact between the clamp hook 22 and the top face 20 serves as the stop for the maximum downward travel of the plunger 32. (In this way there is always a partially compressed spring 30.) When pressure is exerted on the plunger 32, it is depressed upward and slides up in the central cavity 28 forcing the clamp hook 22 upward through the through bore in the top cap 26 of the winder post 14 against the downward pressure of the compressing spring 30. Releasing the pressure on the plunger 32 allows the spring 30 to force the plunger 32 downward until the clamp hook 22 contacts the top face 20 and is seated into the groove 24 in the top face 20 of the top cap. If a line is beneath the hook in the clamp hook 22 it will be frictionally trapped on the top cap 26.

Figure 12:
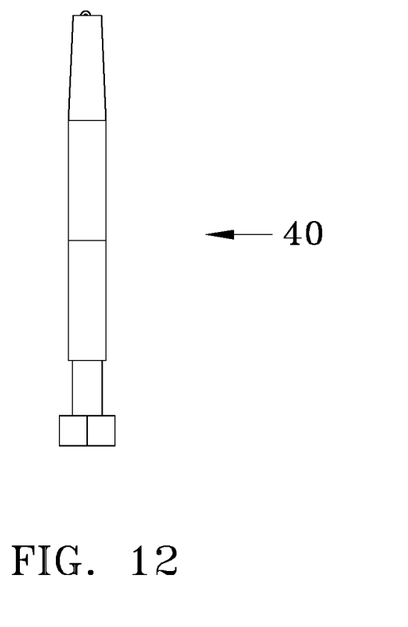
FIG. 12 is a front view of the line holder clamp.
Figure 13:
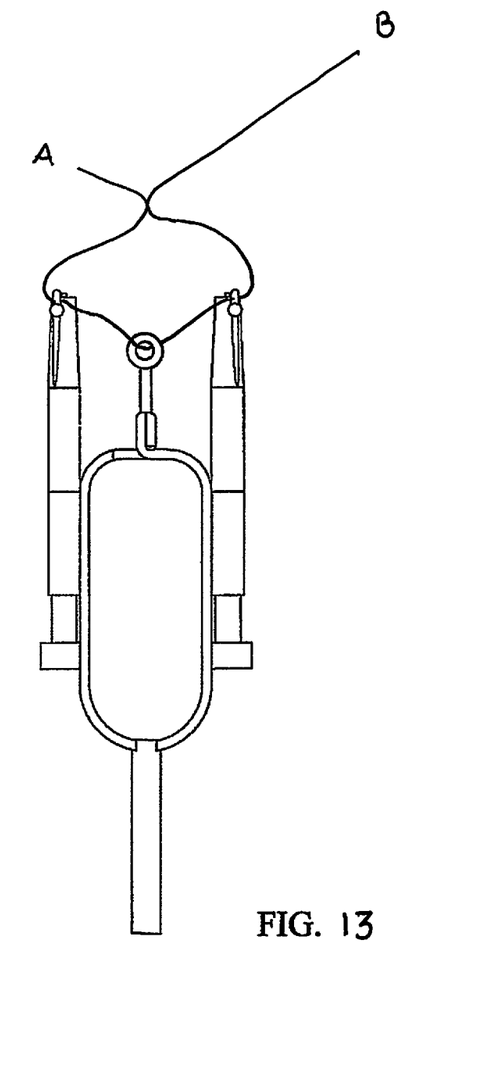
FIG. 13 is a front view of the first step in tying a knot with the tool.
Figure 14:
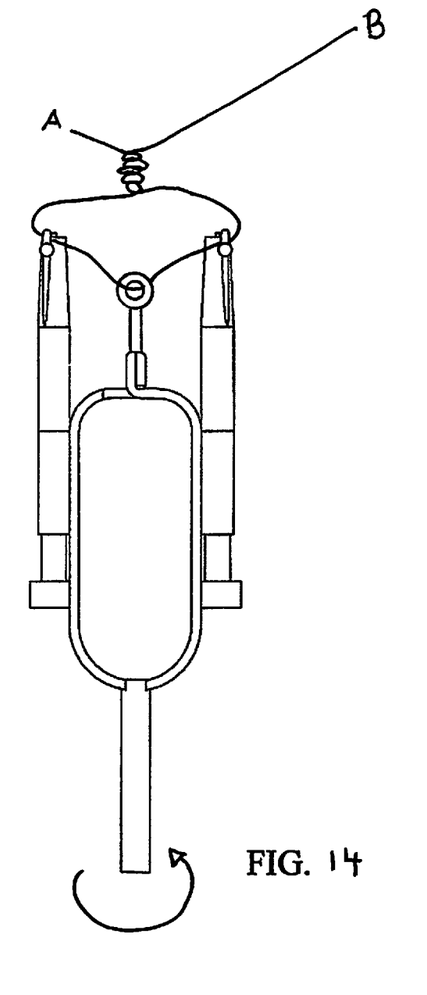
FIG. 14 is a front view of the second step in tying a knot with the tool.
Figure 15:
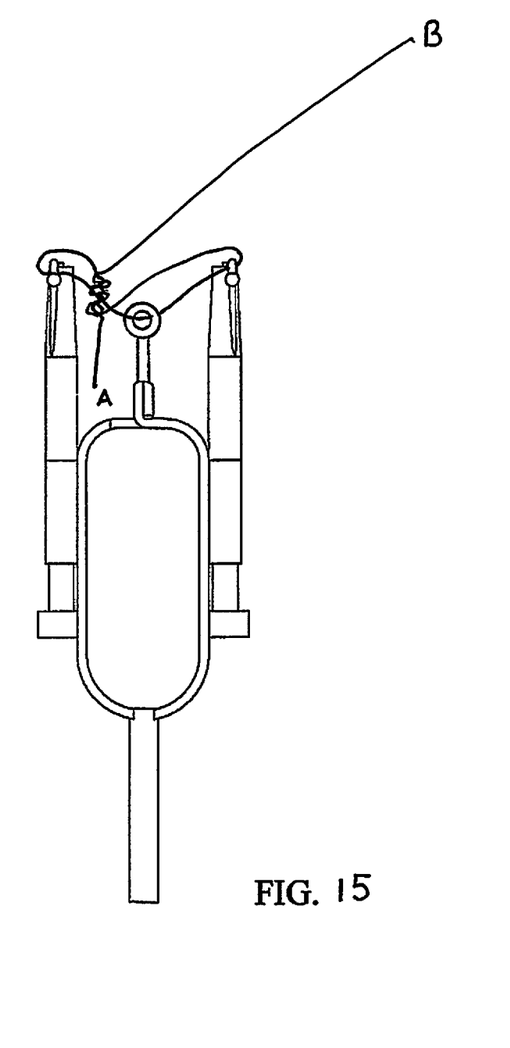
FIG. 15 is a front view of the third step in tying a knot with the tool.

FIG. 12 shows a front view of the line holder clamp 40. This is a winder post 14 that has no line winder hook 16. It functions to clamp onto one or more of the loose ends of the fishing line/s to be tied and allows the insertion of these loose ends through parts of the knot when tying. In cross section it looks identical to FIGS. 10 and 11. The line clamping aspect is performed with a clamp hook 42 in the identical fashion as described above with the winder post 14.

To thread fishing line through the eyelet of a hook of leader, the hook or leader can be clamped between the jaws of the pliers and while grasping the sides of the pliers 12 with one hand, the other hand can hold a length of the fishing line adjacent the end and the free end of the fishing line can be negotiated through the eyelet by movement of either or both hands. Controlling the loose end of the leader, hook or the like is the key to a successful, quick threading operation.

Figure 16:
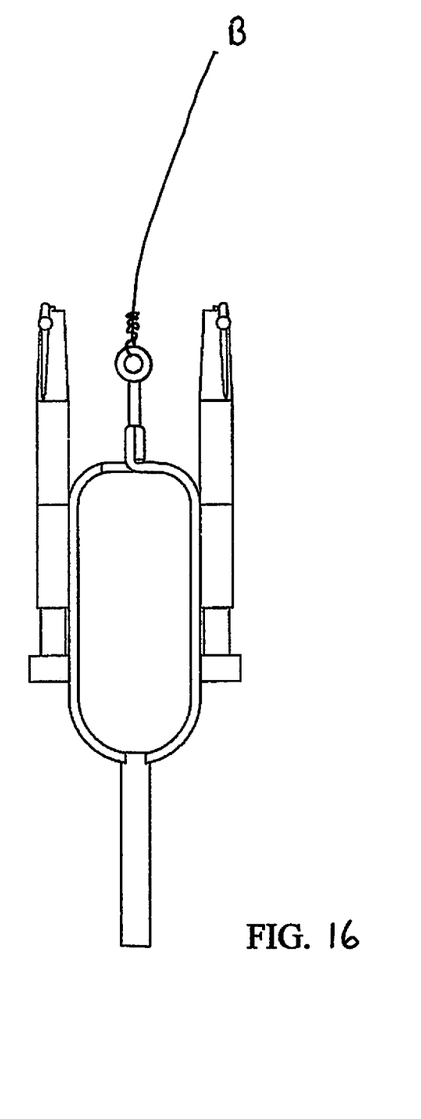
FIG. 16 is a front view of the fourth step in tying a knot with the tool.

Looking at FIGS. 13-16 four steps of tying a knot with fishing line to an eyelet bearing fishing accessory such as a hook or leader. First the hook is clamped in the plier jaws with the eyelet extending up. The fishing line is threaded through the eyelet and the two ends A and B are draped under the winder hook horns and brought together and held above the tool. (FIG. 13) It is to be noted that at this point the optional line holder clamp 40 may be attached to the threading end A of the line. The spinning post is rotated several times in the direction indicated by the arrow while the fishing line is held as above. (FIG. 14) End A is dropped down through the loop defined by the line between the winder hook horns. The line is optionally moistened at this point. (FIG. 15) Lastly the two ends are pulled taut and the wound knot is tied and complete. (FIG. 16)

With this device it is possible to negotiate the complex knotting necessary for the attachment of fishing line to other fishing line, leaders, lures, jigs, plugs or hooks. It allows for the continued separation and centralization of the fishing line and the other fishing accessories between the clamp hooks 22 or hook horns 16 and the plier jaws 8. When the various lines and components are properly positioned, the tool 2 can be spun about its linear axis by turning the spinning post 10 to twist the fishing line and loop it through the openings established for knotting. It is key to the operation of the tool 2 that the spinning post 10 be located equidistant between the clamp hooks 22 and hook horns on the plane defined between the clamp hooks 22 and hook horns 16. It is also key to the operation of the tool 2 that the jaws 8 of the pliers 4 be located equidistant between the clamp hooks 22 and hook horns 16 on the plane defined between the clamp hooks 22 and hook horns 16. In this way the spinning of the tool 2 by the spinning post 10 revolves and winds together fishing lines on the two clamp hooks 22 and hook horns 16. Tying of complex knots such as blood knots require this While certain features and aspects have been described with respect to exemplary embodiments, one skilled in the art will recognize that numerous modifications are possible. In the way of an example of this, the pliers may have two handles that are tensioned to have their jaws closed by a mechanical closing device affixed between said handles and a spinning post affixed thereto.

Moreover, while the procedures of the fishing line tying methods and processes described herein are described in a particular order for ease of description, unless the context dictates otherwise, various procedures may be reordered, added, and/or omitted in accordance with different ways of tying the knots. Hence, the various components and/or features described herein with respect to the disclosed embodiment can be substituted with equivalent structural or functional components, unless the context dictates otherwise. Consequently, it will be appreciated that the invention is intended to cover all modifications and equivalents within the scope of the following claims.

Having thus described the invention, what is claimed as new and desired to be secured by Letters Patent is as follows:

1. A fishing line tying tool for tying knots, tying flies and threading eyelets, comprising:
   a pliers having at least one handle and a pair of opposable jaws;
   a pair of winder posts affixed to said handle; and
   a spinning post connected to said pair of pliers;
   wherein said pliers have a longitudinal axis that is common with a longitudinal axis of said spinning post.

2. The fishing line tying tool of claim 1 wherein said winder posts are equidistant from said longitudinal axis of said fishing line tying tool.

3. The fishing line tying tool of claim 1 wherein said handle maintains a constant pressure on said jaws to maintain them in a normally closed position.

4. The fishing line tying tool of claim 1 wherein said pliers have a single, one piece handle.

5. The fishing line tying tool of claim 4 wherein said handle is elastically deformable.

6. The fishing line tying tool of claim 1 further comprising at least two hook horns, wherein said hook horns extend from said winder posts and are adapted to position and maintain the separation of a fishing line.

7. The fishing line tying tool of claim 6 further comprising at least two line retention means, wherein each hook horn forms a downward semi circular arc from said winder post 14, and said line retention means are affixed to said winder post.

8. The fishing line tying tool of claim 1 further comprising at least two line winder clamp hooks, said clamp hooks having an arced tip that is retractably extendable from a top face of said winder posts.

9. The fishing line tying tool of claim 8 wherein said top face has a groove formed thereon to accept said arced tip.

10. The fishing line tying tool of claim 8 wherein said winder posts are made of:
    a body with a central void;
    a top cap with a longitudinal through bore, said top cap affixed to said body;
    a slideable plunger partially inserted into said void, said plunger having a first end of said winder clam hook affixed thereto; and
    a compressible linear spring residing in said central void between said top cap and said slideable plunger;
    wherein said line winder clamp hooks extend from said plunger through said central void, said spring and said longitudinal bore such that in an non extended state, said arced tip resides in said groove.

11. A fishing line tying tool for tying knots, tying flies and threading eyelets, comprising:
    a pliers having a single oval handle and a pair of opposable jaws;
    a pair of winder posts affixed to opposing sides of said handle; and
    a circular cross section spinning post connected at a bottom of said handle;
    wherein there is a common linear axis that runs through said pliers and said spinning post.

12. The fishing line tying tool of claim 11 wherein said winder posts are equidistant from said longitudinal axis of said fishing line tying tool.

13. The fishing line tying tool of claim 12 wherein said handle maintains a constant pressure on said jaws to maintain them in a normally closed position.

14. The fishing line tying tool of claim 13 wherein said handle is elastically deformable.

15. The fishing line tying tool of claim 14 further comprising at least two hook horns, wherein said hook horns extend from said winder posts and are adapted to position and maintain the separation of a fishing line.

16. The fishing line tying tool of claim 15 further comprising at least two line retention means, wherein each hook horn forms a downward semi circular arc from said winder post 14, and said line retention means are affixed to said winder post.

17. The fishing line tying tool of claim 16 further comprising at least two line winder clamp hooks, said clamp hooks having an arced tip that is retractably extendable from a top face of said winder posts.

18. The fishing line tying tool of claim 17 wherein said top face has a groove formed thereon to accept said arced tip.

19. The fishing line tying tool of claim 18 wherein said winder posts are made of:
    a body with a central void;

a top cap with a longitudinal through bore, said top cap affixed to said body;

a slideable plunger partially inserted into said void, said plunger having a first end of said winder clam hook affixed thereto; and a compressible linear spring residing in said central void between said top cap and said slideable plunger;

wherein said line winder clamp hooks extend from said plunger through said central void, said spring and said longitudinal bore such that in an non extended state, said arced tip resides in said groove.

\* \* \* \* \*